(12) United States Patent
Cochran (10) Patent No.: US 7,178,394 B2
(45) Date of Patent: Feb. 20, 2007

(54) PRESSURE TESTING ASSEMBLIES FOR USE IN FLOW BODIES AND METHODS OF TESTING FLOW BODIES

(75) Inventor: Lee T. Cochran, Seattle, WA (US)

(73) Assignee: The Boeing Company, Chicago, IL (US)

( * ) Notice: Subject to any disclaimer, the term of this patent is extended or adjusted under 35 U.S.C. 154(b) by 9 days.

(21) Appl. No.: 11/061,798

(22) Filed: Feb. 17, 2005

(65) Prior Publication Data

US 2006/0179933 A1     Aug. 17, 2006

(51) Int. Cl.
*A63B 53/00* (2006.01)
(52) U.S. Cl. .................................. 73/170.02
(58) Field of Classification Search ............. 73/170.02
See application file for complete search history.

(56) References Cited

U.S. PATENT DOCUMENTS 5,616,861 A * 4/1997 Hagen .......................... 73/180
6,002,972 A * 12/1999 Palmer ........................... 701/4
6,668,640 B1 * 12/2003 Alwin et al. ............. 73/170.02
6,772,976 B1 * 8/2004 Rouse et al. ................. 244/1 R

* cited by examiner

*Primary Examiner*—Max Noori
(74) *Attorney, Agent, or Firm*—Perkins Coie LLP (57) ABSTRACT

Pressure testing assemblies for use in flow bodies, testing systems, and methods of testing flow bodies are disclosed herein. In one embodiment, a pressure testing assembly includes a support member and a plurality of electronic pressure-sensing modules detachably coupled to the support member. The support member includes a plurality of first ports, a plurality of second ports, and a plurality of passageways connecting the first ports to corresponding second ports. The first ports are arranged for attachment to corresponding pressure ports on the flow body. The pressure-sensing modules are positioned at corresponding groups of second ports to measure the pressure at the pressure ports on the flow body.

23 Claims, 6 Drawing Sheets

PRESSURE TESTING ASSEMBLIES FOR USE IN FLOW BODIES AND METHODS OF TESTING FLOW BODIES

TECHNICAL FIELD

The present invention is related to pressure testing assemblies for use in flow bodies and methods of testing flow bodies.

BACKGROUND

Wind tunnels are used to test the aerodynamic properties of airfoils and other aerodynamic models. A conventional wind tunnel includes a tunnel, a fan for driving air through a test section of the tunnel, and a cone for increasing the velocity of the air flowing from the fan to the test section of the tunnel. The wind tunnel may also include a diffuser for reducing the velocity of the air exiting the test section of the tunnel.

The results from a wind tunnel test can be used to determine the lift, drag, pitching moment, and/or other aerodynamic characteristics of a model. In several applications, it is necessary to measure the pressure at different points on the model to calculate one or more of these characteristics. In such applications, a plurality of electronic pressure-sensing modules are placed in the model and connected to pressure ports on the model body to measure the pressure at each of the ports. The pressure-sensing modules are typically positioned side by side and taped to a plate within the model. Sections of flexible tubing are attached between connectors on the upper surface of the pressure-sensing modules and corresponding pressure ports so that the pressure-sensing modules are in fluid communication with the pressure ports during a test.

One drawback of conventional wind tunnel testing is that the limited space within the aerodynamic model restricts the number of pressure-sensing modules that can be placed in the model. This limits the number of pressure ports at which the pressure can be measured and, consequently, the data gathered during a single wind tunnel test. Another drawback of conventional wind tunnel testing is that there are no direct methods to mount the pressure-sensing modules. The modules are commonly taped to the model's interior structure. This tape can detach due to heat and vibration, allowing the modules to move around inside the model, which is especially problematic when the testing includes rough and/or inverted flight conditions. The movement of the modules may pinch the flexible tubing and/or decouple the tubing from the modules or model. Pinched and decoupled tubes not only skew the test results, but it is time-consuming and labor-intensive to identify which tubes are problematic.

Another drawback of conventional wind tunnel testing is that connecting the sections of flexible tubing between the pressure ports on the aerodynamic model and the corresponding sensing ports on the pressure-sensing modules is extremely time-consuming and labor-intensive. For example, in several applications, the model may include over 1000 pressure ports. Because the pressure-sensing modules are expensive, the modules are typically removed after each test and placed in other models. As such, the slow and expensive process of connecting and disconnecting the sections of flexible tubing between the pressure ports and the sensing ports is repeated each time a model is retested. Accordingly, there is a need to improve the system and method for testing aerodynamic models in wind tunnels.

SUMMARY

Several aspects of the invention are directed to pressure testing assemblies for use in flow bodies, testing systems, and methods for testing flow bodies. A pressure testing assembly in accordance with one embodiment includes a support member and a plurality of electronic pressure-sensing modules detachably coupled to the support member. The support member includes a plurality of first ports, a plurality of second ports, and a plurality of passageways connecting the first ports to corresponding second ports. The first ports are arranged for attachment to corresponding pressure ports on the flow body. The pressure-sensing modules are positioned at corresponding groups of second ports to measure the pressure at the pressure ports on the flow body. The support member can be configured to be removably attached to the flow body and/or received within the flow body during testing. The testing assembly may further include a plurality of interface members positioned between corresponding pressure-sensing modules and the support member.

Another aspect of the invention is directed to testing systems. In one embodiment, a testing system includes a flow body with a plurality of pressure ports and a plurality of electronic pressure-sensing modules for measuring the pressure at the pressure ports. The individual pressure-sensing modules are carried by the flow body and have an array of sensing ports. The system further includes means for coupling the pressure ports of the flow body to corresponding sensing ports of the sensing modules without attaching flexible tubing directly to the pressure-sensing modules. The means for coupling the pressure ports to the sensing ports can include a hub carrying the pressure-sensing modules and a plurality of flexible tubes connecting the hub to corresponding pressure ports.

Another aspect of the invention is directed to methods of testing flow bodies. In one embodiment, a method includes positioning a support member at least partially within the flow body. The support member includes a plurality of first ports and a plurality of second ports in fluid communication with corresponding first ports. The method further includes (a) coupling at least some of the first ports on the support member to corresponding pressure ports on the flow body so that the first ports are in fluid communication with the pressure ports, (b) mounting a plurality of electronic pressure-sensing modules to the support member at corresponding arrays of second ports, and (c) measuring the pressure at several of the pressure ports on the flow body with at least one electronic pressure-sensing module.

DETAILED DESCRIPTION

The following disclosure describes pressure testing assemblies for use in flow bodies and methods for testing flow bodies. Certain details are set forth in the following description and in FIGS. 1–6B to provide a thorough understanding of various embodiments of the invention. Other details describing well-known structures and systems often associated with pressure testing assemblies and flow bodies are not set forth in the following disclosure to avoid unnecessarily obscuring the description of various embodiments of the invention. Many of the details, dimensions, angles, and other features shown in the figures are merely illustrative of particular embodiments of the invention. Accordingly, other embodiments can have other details, dimensions, and/or features without departing from the present invention. In addition, further embodiments of the invention may be practiced without several of the details described below, or various aspects of any of the embodiments described below can be combined in different embodiments.

Figure 1:
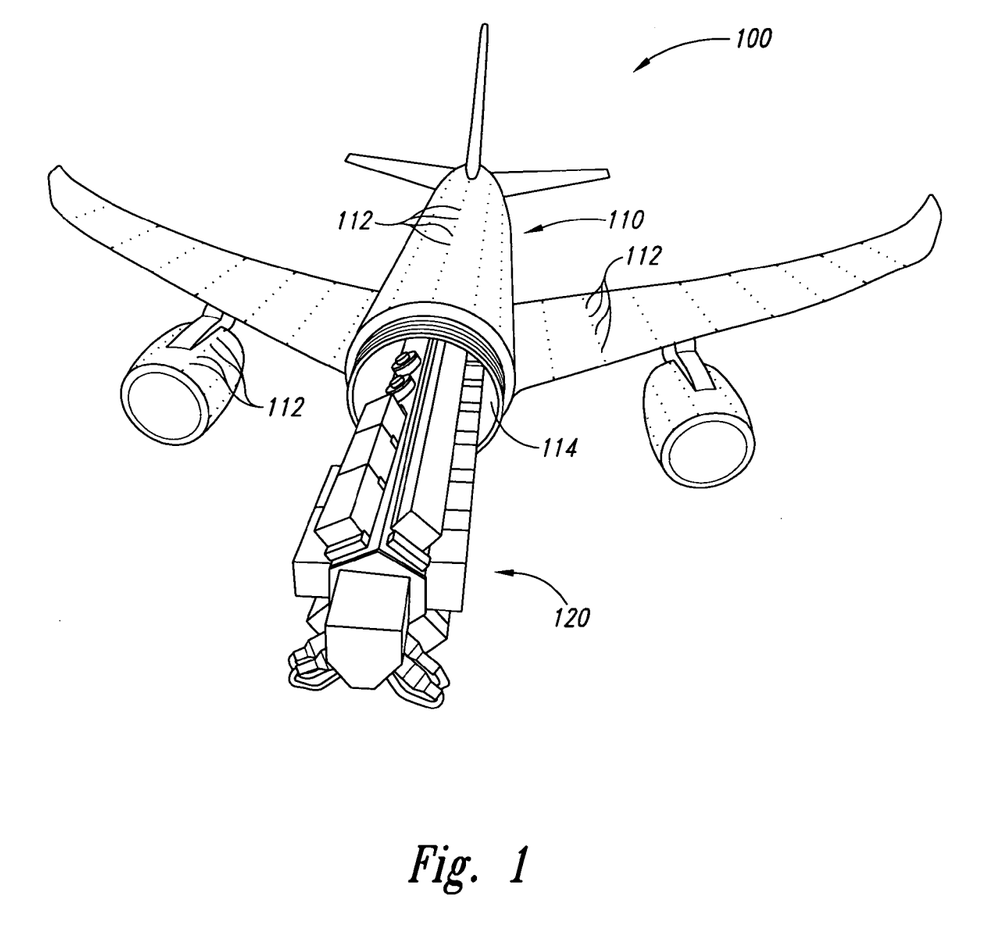
FIG. 1 is a schematic isometric view of a testing system including an aerodynamic model and a pressure testing assembly for measuring the pressure at numerous points on the model in accordance with one embodiment of the invention.

FIG. 1 is a schematic isometric view of a testing system 100 including an aerodynamic model 110 and a pressure testing assembly 120 for measuring the pressure at numerous points on the model 110 in a wind tunnel or other fluid environment in accordance with one embodiment of the invention. Although the illustrated testing system 100 includes an aerodynamic model, other testing systems may include other flow bodies, including, for example, a hydrodynamic model, a missile, or another body for use and/or testing in a fluid environment. In such embodiments, the fluid environment can be a fluid chamber, a body of water, the atmosphere, or another suitable environment.

The illustrated aerodynamic model 110 includes a plurality of pressure ports 112 at which the pressure is measured and a chamber 114 sized to receive the testing assembly 120. The pressure ports 112 can be arranged across the wings, fuselage, and/or nacelles of the model 110. A nose section (not shown) of the model 110 enclosing the chamber 114 has been removed in FIG. 1 to illustrate the position of the testing assembly 120 within the model 110. During testing, however, the nose section of the model 110 is attached to enclose the testing assembly 120 within the chamber 114. Although the illustrated aerodynamic model 110 is a model of an entire aircraft, in other embodiments, the model can be an airfoil or another section of an aircraft.

Figure 2:
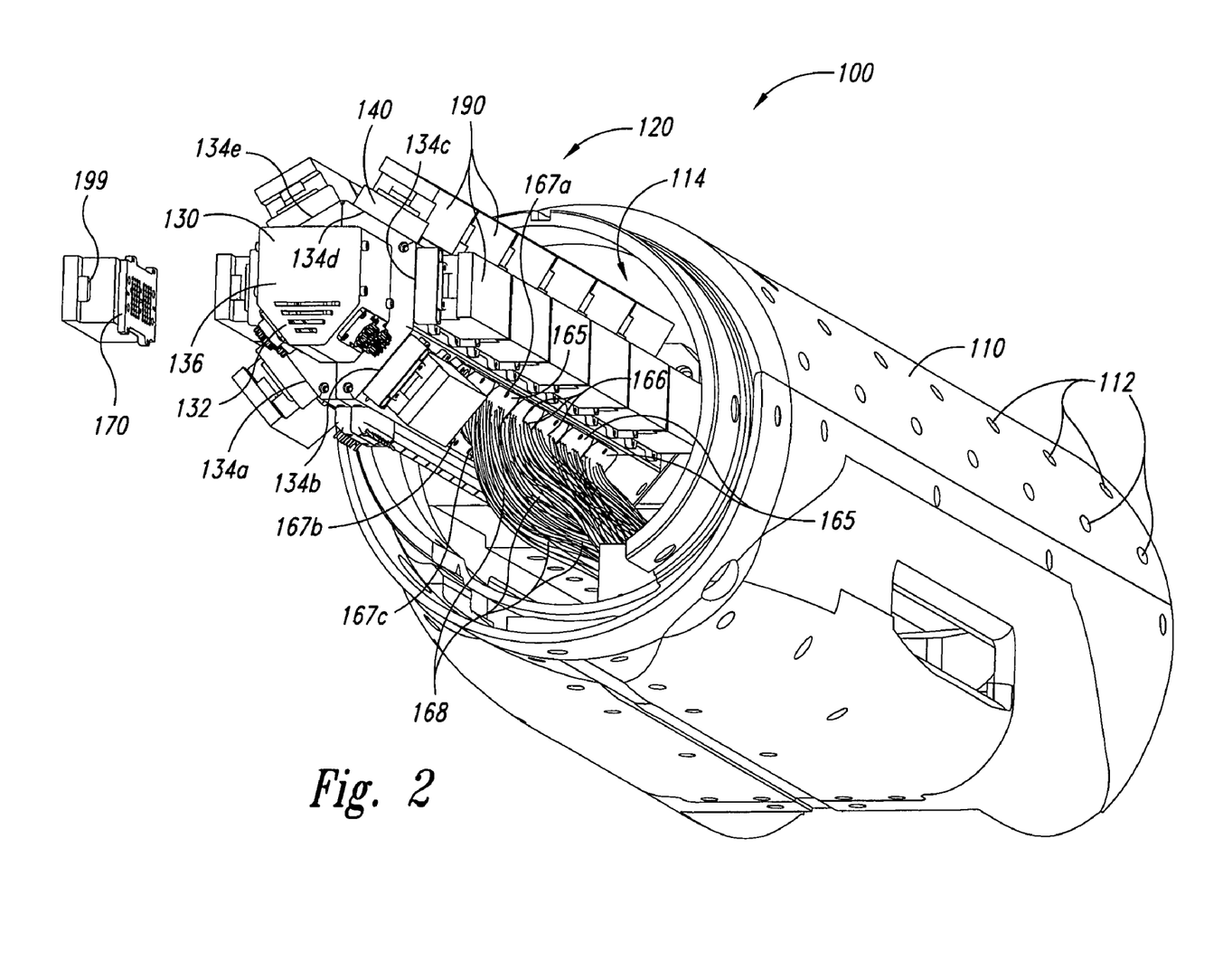
FIG. 2 is a schematic isometric view of a portion of the testing system of FIG. 1.

FIG. 2 is a schematic isometric view of a portion of the testing system 100 illustrated in FIG. 1. The illustrated pressure testing assembly 120 includes a support member or hub 130, a plurality of mounting plates 165 coupled to the hub 130, a plurality of flexible tubes 168 attached to each mounting plate 165, and a plurality of electronic pressure-sensing modules 190 coupled to the hub 130. The individual mounting plates 165 include a plurality of holes 166 arranged in an array and a plurality of connectors (not shown) at corresponding holes 166 to securely attach the flexible tubes 168 to the plates 165. The mounting plates 165 are removably attached to the hub 130 and the flexible tubes 168 are securely attached to the mounting plates 165 so that several tubes 168 can be coupled to or detached from the hub 130 by attaching the plate 165 to or removing the plate 165 from the hub 130. The illustrated mounting plates 165 also include a single mounting hole 167a at one end and two mounting holes 167b–c at the other end. This configuration ensures that the mounting plates 165 are attached to the hub 130 with the same orientation during each test. In additional embodiments, the mounting plates 165 can have other configurations, or the testing assembly 120 may not include mounting plates 165 and the flexible tubes 168 can be connected directly to the hub 130.

The flexible tubes 168 are also coupled directly or indirectly to corresponding pressure ports 112 so that the hub 130 is in fluid communication with the pressure ports 112. The hub 130, in turn, connects the flexible tubes 168 to the electronic pressure-sensing modules 190 so that the modules 190 are in fluid communication with the pressure ports 112 to measure the pressure at the ports 112, as described in detail below with reference to FIGS. 3 and 4. In other embodiments, the testing assembly 120 may not include flexible tubes, but rather the testing system 100 can include rigid tubes for connecting the pressure ports 112 to the hub 130.

Figure 3:
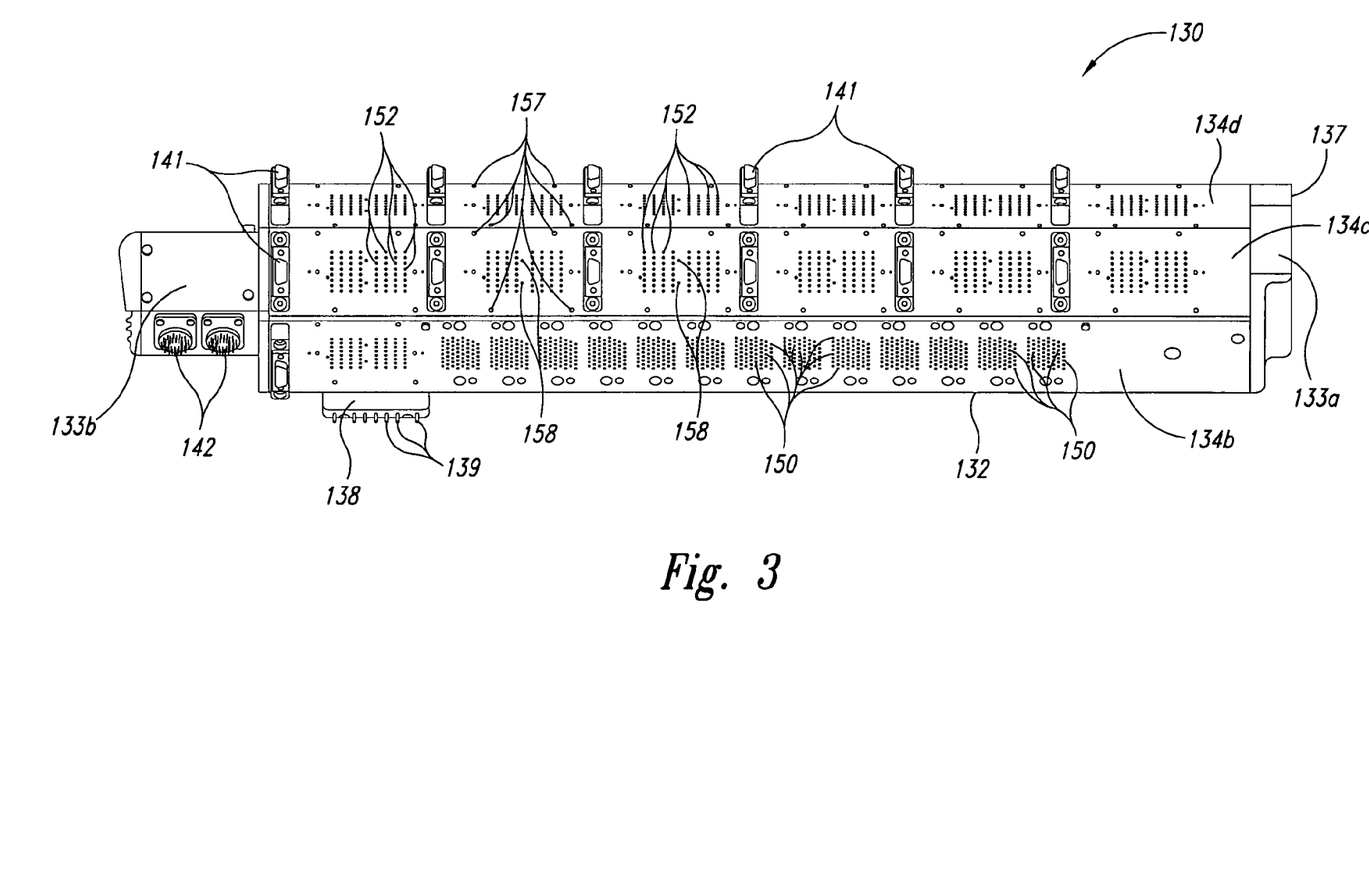
FIG. 3 is a schematic side view of a hub of the testing system of FIG. 1.

FIG. 3 is a schematic side view of the hub 130 detached from the aerodynamic model 110 (FIG. 2) and with the mounting plates 165 (FIG. 2) and electronic pressure-sensing modules 190 (FIG. 2) removed. The illustrated hub 130 includes an elongated housing 132 with a proximal end portion 133a, a distal end portion 133b opposite the proximal end portion 133a, and a plurality of external surfaces 134 (identified individually as 134b–d in FIG. 3 and 134a–e in FIG. 2) extending between the proximal and distal end portions 133a–b. The proximal end portion 133a can include a mounting bracket 137 for attaching the hub 130 to the aerodynamic model 110. The illustrated external surfaces 134 are generally flat to facilitate attachment of the mounting plates 165 and the pressure-sensing modules 190 to the hub 130. The illustrated housing 132 further includes a plurality of first ports 150 in the first and second surfaces 134a–b and a plurality of second ports 152 in the first, second, third, fourth, fifth, and sixth surfaces 134a–f. The first ports 150 are arranged in arrays that correspond with the holes 166 in the mounting plates 165 so that the first ports 150 are in fluid communication with corresponding flexible tubes 168 when the mounting plates 165 are attached to the hub 130. The second ports 152 are arranged in arrays that correspond with the sensing ports in the electronic pressure-sensing modules 190.

Figure 4:
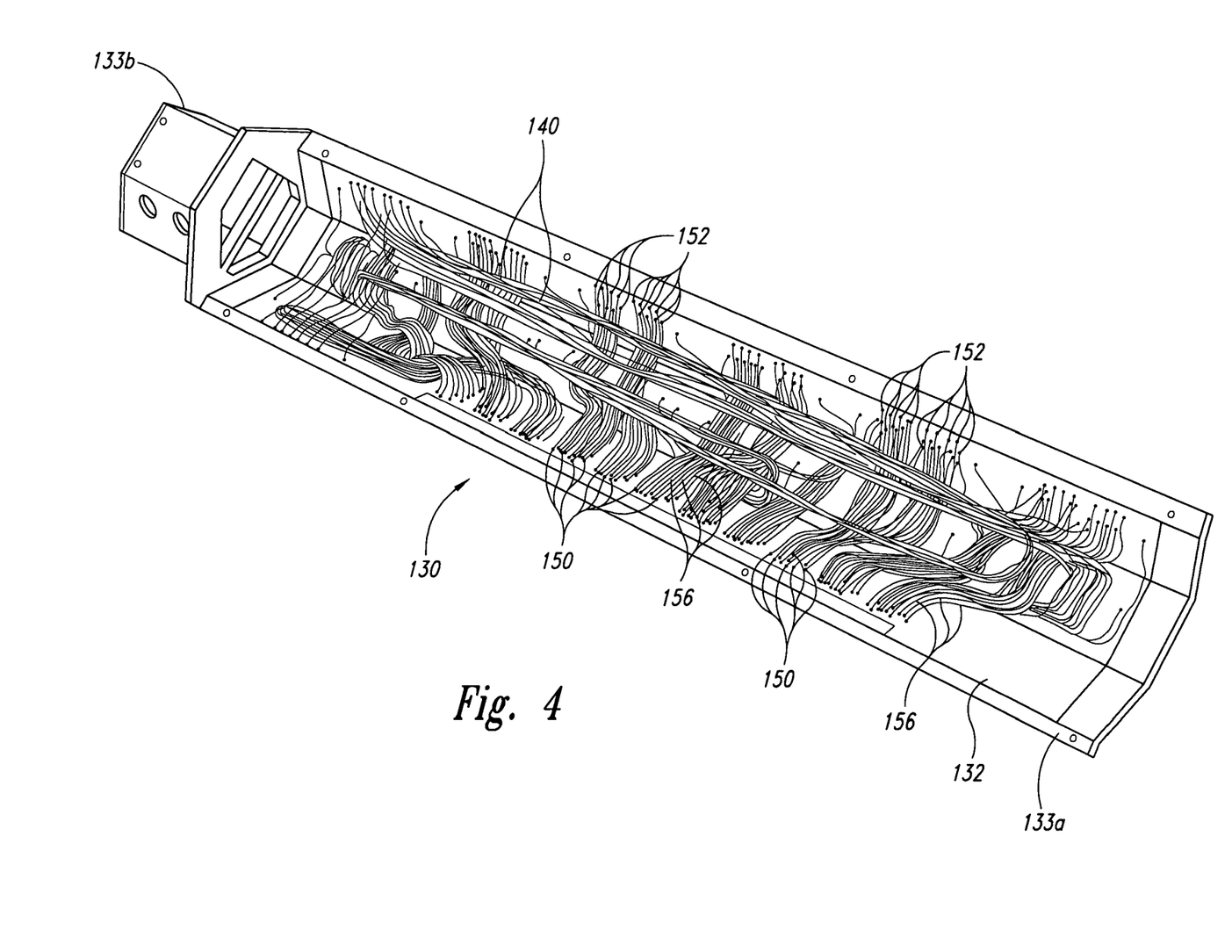
FIG. 4 is a schematic cross-sectional view of a housing of the hub of FIG. 3.

FIG. 4 is a schematic cross-sectional view of the hub 130 and the housing 132 of FIG. 3. The illustrated housing 132 further includes a plurality of conduits 156 coupling the first ports 150 to corresponding second ports 152 so that the first and second ports 150 and 152 are in fluid communication with each other. The conduits 156 can be rigid or flexible tubes. For example, in the illustrated embodiment, the conduits 156 are stainless steel tubes rigidly attached to the first and second ports 150 and 152. The conduits 156 accordingly couple the first and second ports 150 and 152 so that the pressure ports 112 (FIG. 1) on the aerodynamic model 110 (FIG. 1) are in fluid communication with corresponding sensing ports on the pressure-sensing modules 190 (FIG. 2).

Referring back to FIG. 3, the illustrated hub 130 further includes a pneumatic input 138 between the first and second surfaces 134a–b, a plurality of first electrical connectors 141 arranged adjacent to corresponding arrays of second ports 152, and a plurality of second electrical connectors 142 at the distal end portion 133b of the housing 132. The pneumatic input 138 includes a plurality of connectors 139 positioned for attachment to control gas lines (not shown). The control gas lines flow a gas to the hub 130 for controlling the pressure-sensing modules 190. A plurality of control conduits 140 (illustrated in FIG. 4) couple the connectors 139 to corresponding second ports 152 so that the control gas lines are in fluid communication with the pressure-sensing modules 190. In other embodiments in which the pressure-sensing modules 190 are not pneumatically controlled, the hub 130 may not include the pneumatic input 138.

The first electrical connectors 141 on the hub 130 are configured to engage corresponding connectors on the pressure-sensing modules 190 to output signals from the modules 190. The first electrical connectors 141 are electrically connected to the second electrical connectors 142 at the distal end portion 133b of the housing 132. The hub 130 accordingly outputs the data from the pressure-sensing modules 190 via the second electrical connectors 142. The hub 130 may also include a voltage regulator assembly at the distal end portion 133b to amplify, manipulate, or otherwise modify the electrical signals from the pressure-sensing modules 190.

Figure 5:
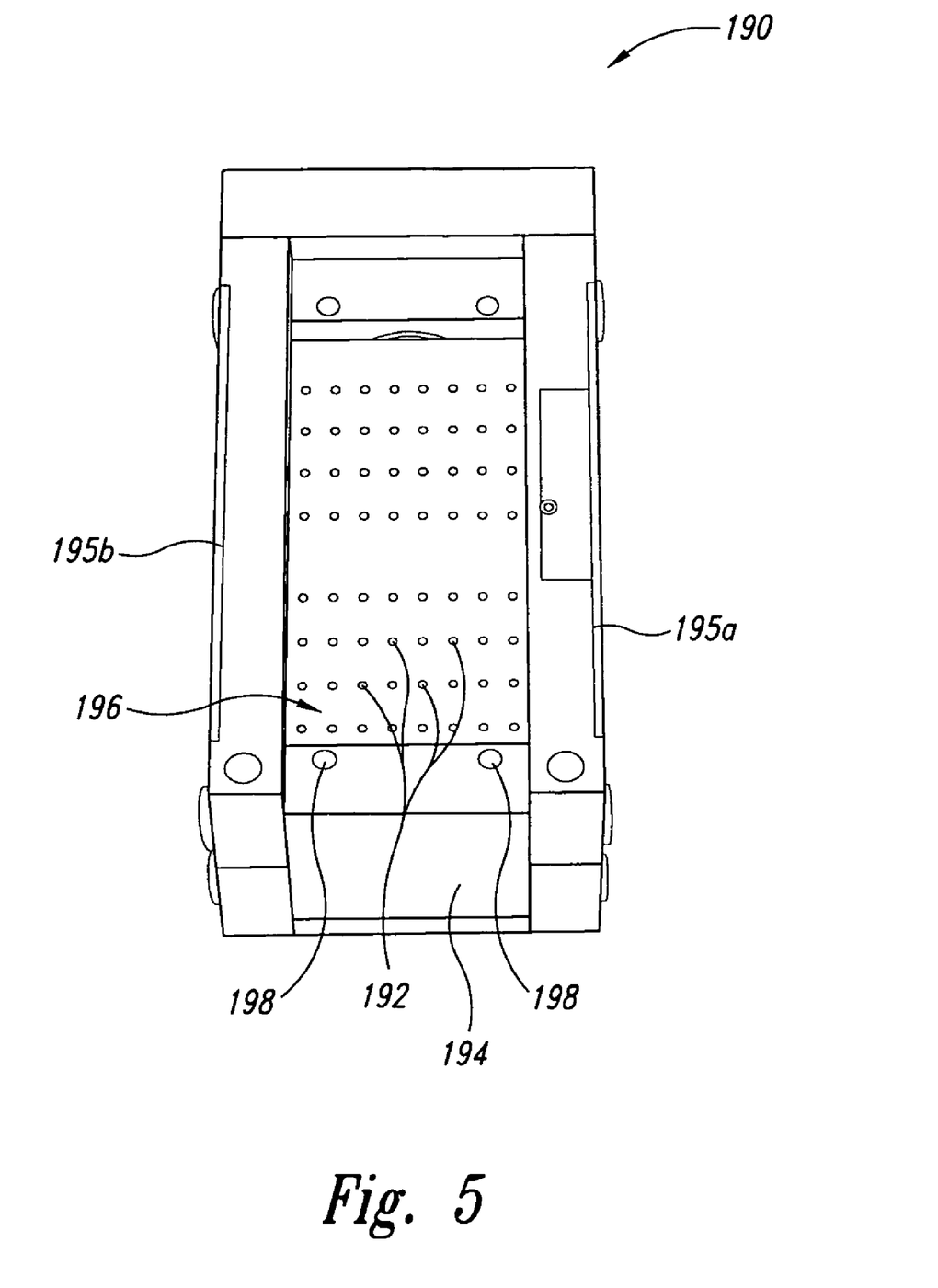
FIG. 5 is a schematic isometric view of an electronic pressure-sensing module of the testing system in accordance with one embodiment of the invention.

FIG. 5 is a schematic top isometric view of an electronic pressure-sensing module 190 in accordance with one embodiment of the invention. The pressure-sensing module 190 includes a plurality of sensing ports 192, a sensor (not shown) for measuring the pressure of the fluid at the sensing ports 192, and an electrical connector 199 (shown in FIG. 2) for connecting with the first electrical connectors 141 on the hub 130. The illustrated sensing ports 192 are arranged in an array that corresponds with the individual arrays of second ports 152 so that the sensing ports 192 are in fluid communication with corresponding second ports 152 when the pressure-sensing module 190 is attached to the hub 130 (FIG. 3). The illustrated pressure-sensing module 190 further includes a body 194 having a plurality of side walls 195 (identified individually as 195a–b), a trench 196 over the sensing ports 192 and between the side walls 195, and a plurality of mounting holes 198. Suitable pressure-sensing modules 190 include the model ESP64HD electronic pressure scanning module manufactured by Pressure Systems, Inc., of Hampton, Va. In this particular module, the tubulation cover may be removed before the module is attached to the hub 130. In additional embodiments, the pressure-sensing module 190 may not include the trench 196, and/or the module 190 may have a different configuration.

Figure 6A:
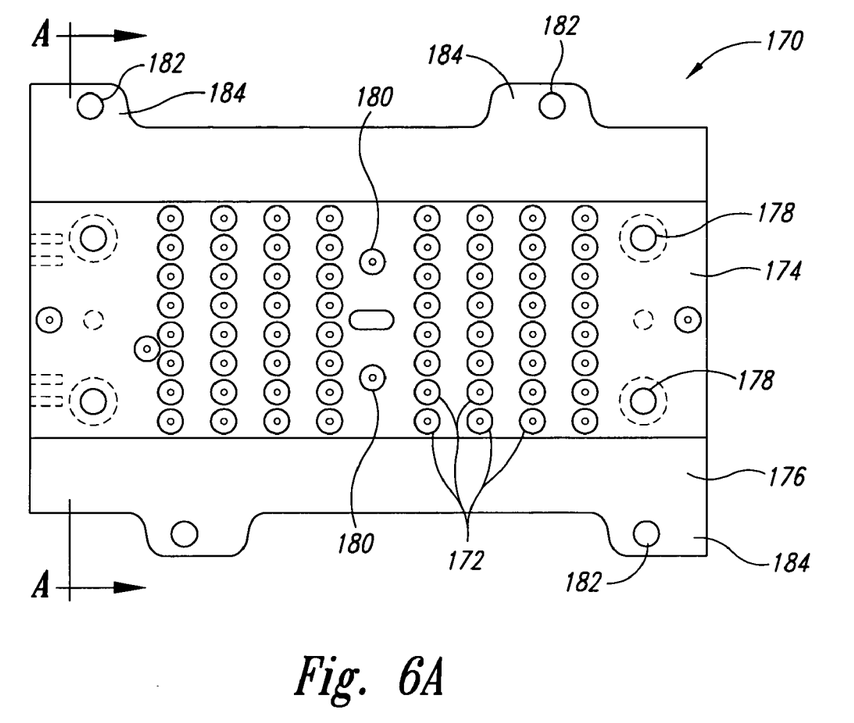
FIG. 6A is a top plan view of an interface member for attaching a pressure-sensing module to the hub in accordance with one embodiment of the invention.
Figure 6B:
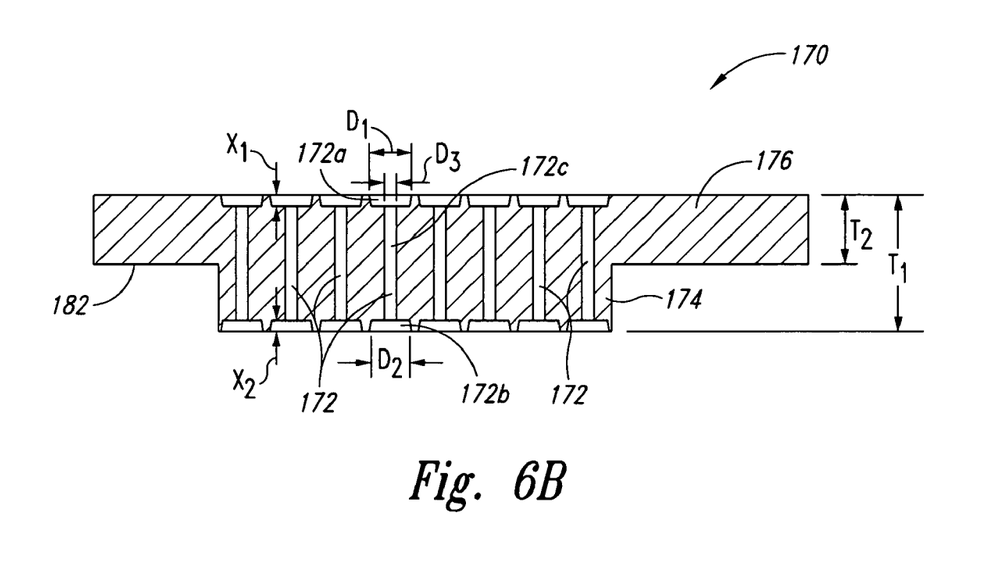
FIG. 6B is a schematic side cross-sectional view of the interface member of FIG. 6A taken substantially along line A—A.

FIG. 6A is a top plan view of an interface member 170 for attaching the pressure-sensing module 190 to the hub 130 in accordance with one embodiment of the invention. FIG. 6B is a schematic side cross-sectional view of the interface member 170 taken substantially along line A—A of FIG. 6A. Referring to both FIGS. 6A and 6B, the illustrated interface member 170 includes a plurality of apertures 172, a first portion 174 having a first thickness $T_1$, and a second portion 176 having a second thickness $T_2$ less than the first thickness $T_1$. The first and second thicknesses $T_1$ and $T_2$ of the first and second portions 174 and 176, respectively, are sized so that the first portion 174 projects into the trench 196 of the pressure-sensing module 190 and the second portion 176 is positioned against the side walls 195 of the module 190. The apertures 172 are arranged in an array in the first portion 174 so as to be aligned with corresponding second ports 152 on the hub 130 and corresponding sensing ports 192 on the electronic pressure-sensing module 190.

Referring only to FIG. 6B, the individual apertures 172 include a first section 172a having a first diameter $D_1$ and a first depth $X_1$, a second section 172b having a second diameter $D_2$ and a second depth $X_2$, and a third section 172c extending between the first and second sections 172a–b and having a third diameter $D_3$ less than the first and second diameters $D_1$ and $D_2$. The first sections 172a are sized to receive an O-ring or other annular seal to form a seal between the apertures 172 and the second ports 152 in the hub 130. The second sections 172b are sized to receive an O-ring or other annular seal to form a seal between the apertures 172 and the sensing ports 192 in the pressure-sensing module 190.

Referring back to FIG. 6A, the interface member 170 may also include a plurality of first mounting holes 178 in the first portion 174 and a plurality of second mounting holes 182 on tabs 184 in the second portion 176. The first mounting holes 178 are aligned with corresponding mounting holes 198 in the pressure-sensing module 190 so that fasteners can attach the interface member 170 to the module 190. The second mounting holes 182 are aligned with corresponding holes 157 (FIG. 3) in the housing 132 for attaching the interface member 170 and the corresponding pressure-sensing module 190 to the hub 130. The interface member 170 may also include a plurality of alignment holes 180 aligned with corresponding holes 158 (FIG. 3) in the hub 130. Alignment pins (not shown) can be placed in the holes 158 and 180 to ensure that the interface member 170 and the pressure-sensing module 190 are properly aligned when the interface member 170 is attached to the hub 130. In other embodiments, the pressure testing assembly 120 may not include the interface members 170, but rather the electronic pressure-sensing modules 190 can be attached directly to the hub 130.

One feature of the testing system 100 illustrated in FIGS. 1–6B is that the hub 130 increases the number of electronic pressure-sensing modules 190 that can be placed within the model 110. Because the pressure-sensing modules 190 are attached to numerous surfaces 134 on the hub 130, several modules 190 can be positioned over other modules 190 to increase the number of modules 190 within a given footprint. An advantage of this feature is that the additional modules 190 can be attached to additional pressure ports 112 so that the testing assembly 120 can gather more data during a single test.

Another feature of the testing system 100 illustrated in FIGS. 1–6B is that the flexible tubes 168 are not attached directly to the pressure-sensing modules 190. As such, the pressure-sensing modules 190 can be removed from and attached to the hub 130 relatively quickly and easily. An advantage of this feature is that the illustrated testing system 100 reduces the operating costs associated with testing models 110 by eliminating the labor-intensive and time-consuming tasks of individually attaching flexible tubes to the pressure-sensing modules 190 before a test and detaching the flexible tubes from the modules 190 after the test.

Another feature of the testing system 100 illustrated in FIGS. 1–6B is that the mounting plates 165 and interface members 170 can only be mounted to the hub 130 with a specific orientation. Accordingly, the relationship between the pressure ports 112 and the corresponding sensing ports 192 remains consistent during multiple tests because the individual pressure ports 112 are coupled to the same sensing ports 192. An advantage of this feature is that the data from multiple tests is not skewed by differences in the pressure-sensing modules 190 and/or sensing ports 192.

Another feature of the testing system 100 illustrated in FIGS. 1–6B is that the electronic pressure-sensing modules 190 and the flexible tubes 168 are securely attached to the hub 130 during testing. Accordingly, the pressure-sensing modules 190 are expected to not move within the model 110 during rough and/or inverted flight testing conditions and pinch and/or detach the flexible tubes 168. This feature advantageously increases the accuracy of the data collected during testing and reduces the downtime required to identify and repair faulty flexible tubes.

From the foregoing, it will be appreciated that specific embodiments of the invention have been described herein for purposes of illustration, but that various modifications may be made without deviating from the invention. For example, aspects of the invention described in the context of particular embodiments may be combined or eliminated in other embodiments. Accordingly, the invention is not limited except as by the appended claims.

I claim:

1. A pressure testing assembly for use in a flow body having a plurality of pressure ports, the assembly comprising:
   a support member including a plurality of first ports, a plurality of second ports, and a plurality of passageways connecting the first ports to corresponding second ports, the first ports arranged for attachment to corresponding pressure ports on the flow body; and
   a plurality of electronic pressure-sensing modules detachably coupled to the support member such that at least one module is coupled at a corresponding group of second ports to measure the pressure at the associated pressure ports on the flow body.

2. The pressure testing assembly of claim 1 wherein:
   the support member comprises a hub;
   the passageways comprise a plurality of rigid tubes extending between the first ports and corresponding second ports;
   the second ports are arranged in arrays and the pressure-sensing modules are coupled to the hub at corresponding arrays of second ports; and
   the pressure testing assembly further comprises a plurality of mounting plates detachably coupled to the hub and a plurality of flexible tubes securely attached to the individual mounting plates such that several flexible tubes are detached from the hub when one of the mounting plates is removed from the hub.

3. The pressure testing assembly of claim 1, further comprising a plurality of interface members positioned between corresponding pressure-sensing modules and the support member.

4. The pressure testing assembly of claim 1 wherein the passageways in the support member comprise rigid conduits.

5. The pressure testing assembly of claim 1 wherein the passageways in the support member comprise flexible conduits.

6. The pressure testing assembly of claim 1 wherein the support member is sized to be positioned within the flow body during testing.

7. The pressure testing assembly of claim 1 wherein the support member further includes a plurality of generally flat external surfaces, and wherein at least several of the external surfaces include multiple arrays of second ports.

8. The pressure testing assembly of claim 1 wherein the support member further includes a plurality of first electrical connectors, and wherein the individual pressure-sensing modules include a second electrical connector configured to engage a corresponding first electrical connector.

9. The pressure testing assembly of claim 1, further comprising a plurality of mounting plates detachably coupled to the support member and a plurality of flexible tubes securely attached to the individual mounting plates, wherein multiple flexible tubes are detached from the support member when one of the mounting plates is removed from the support member.

10. The pressure testing assembly of claim 1 wherein the support member is configured to be removably attached to the flow body.

11. A testing system, comprising:
    a flow body having a plurality of pressure ports;
    a plurality of electronic pressure-sensing modules for measuring the pressure at the pressure ports of the flow body, the individual pressure-sensing modules being carried by the flow body and having an array of sensing ports; and
    means for coupling the pressure ports of the flow body to corresponding sensing ports of the pressure-sensing modules without attaching flexible tubes directly to the pressure-sensing modules, wherein the means for coupling the pressure ports comprise a plurality of first ports coupled to corresponding pressure ports, a plurality of second ports arranged in groups with individual groups attached to corresponding pressure sensing modules, and a plurality of passageways connecting the first ports to corresponding second ports.

12. The testing system of claim 11 wherein the means for coupling the pressure ports to corresponding sensing ports comprise a hub including a plurality of first ports, a plurality of second ports, and a plurality of passageways connecting the first ports to corresponding second ports, the first ports being in fluid communication with corresponding pressure ports on the flow body and the second ports being arranged in arrays on the hub, and wherein the individual electronic pressure-sensing modules are coupled to the hub at corresponding arrays of second ports such that the second ports are in fluid communication with associated sensing ports.

13. The testing system of claim 11 wherein the means for coupling the pressure ports to corresponding sensing ports comprise a plurality of rigid tubes.

14. The testing system of claim 11 wherein the means for coupling the pressure ports to corresponding sensing ports comprise a hub for carrying the pressure-sensing modules.

15. The testing system of claim 11 wherein the means for coupling the pressure ports to corresponding sensing ports comprise a hub for carrying the pressure-sensing modules and a plurality of interface members positioned between corresponding pressure-sensing modules and the hub.

16. The testing system of claim 11 wherein the flow body comprises an aerodynamic model.

17. A method of testing a flow body, comprising:
    positioning a support member at least partially within the flow body, the support member including a plurality of first ports and a plurality of second ports in fluid communication with corresponding first ports;
    coupling at least some of the first ports on the support member to corresponding pressure ports on the flow body so that the at least some first ports are in fluid communication with the pressure ports;
    mounting a plurality of electronic pressure-sensing modules to the support member such that at least one module is coupled at a corresponding group of second ports; and
    measuring the pressure at several of the pressure ports on the flow body with at least one electronic pressure-sensing module.

18. The method of claim 17 wherein positioning the support member comprises attaching a hub to an aerodynamic model.

19. The method of claim 17 wherein mounting the electronic pressure-sensing modules to the support member comprises attaching the electronic pressure-sensing modules to the support member with a plurality of interface members positioned between corresponding pressure-sensing modules and the support member.

20. The method of claim 17 wherein mounting the electronic pressure-sensing modules to the support member comprises coupling the pressure-sensing modules to the support member without attaching flexible tubes directly to the pressure-sensing modules.

21. The method of claim 17 wherein coupling the first ports on the support member to corresponding pressure ports on the flow body comprises attaching a plurality of flexible tubes between corresponding first ports and pressure ports.

22. The method of claim 17 wherein the support member further includes a plurality of generally flat external surfaces, and wherein mounting the pressure-sensing modules to the support member comprises coupling the pressure-sensing modules to at least several of the external surfaces.

23. The method of claim 17 wherein coupling the first ports to corresponding pressure ports comprises securely attaching a plurality of flexible tubes to a mounting plate and coupling the mounting plate to the support member.

* * * * *